United States Patent Office 2,980,579
Patented Apr. 18, 1961

2,980,579

ACYLIMINO - 2,2,4,4,5 - PENTACHLOROCYCLO-PENTANONES AS NEMATOCIDES AND FUNGICIDES

Sidney B. Richter and Harold J. Wahlborg, Chicago, Ill., assignors to Velsicol Chemical Corporation, Chicago, Ill., a corporation of Illinois No Drawing. Filed Jan. 12, 1959, Ser. No. 786,039

10 Claims. (Cl. 167—30)

This invention relates to new compositions of matter. More specifically, this invention relates to compounds of the general formula

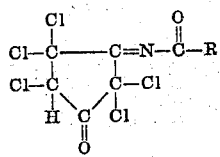

wherein R is selected from the group consisting of hydrocarbon radicals and monochlorinated hydrocarbon radicals, said radicals containing from 1 to 17 carbon atoms. These new compounds, which are substituted imines of a pentachlorocyclopentanone, have been found to be unusually effective as pesticides, particularly as fungicides and nematocides.

The new compounds of the invention can be prepared readily by the condensation of 3-imino-2,2,4,4,5-pentachlorocyclopentanone with the appropriate acid halide,

(X is halogen and R is as defined above) in the presence of an acid catalyst such as sulfuric acid or p-toluenesulfonic acid. The concentration of the catalyst is not critical, since as little as 5–10 drops of concentrated sulfuric acid has been found to catalyze a reaction involving 1 mole of the imine. At least one mole of acid halide should be present for each mole of imine, although it is preferred to use an excess of acid halide. It is advantageous to use pure imine in the reaction, since the purity favors good yields of pure product. The reaction takes place satisfactorily without a solvent, but inert solvents can be used if desired. Refluxing the reaction mixture for from a few minutes to several hours hastens the reaction. The reaction mixture can be worked up by pouring it into cold water and separating the precipitated solid or oil or by distilling off the unreacted starting materials in vacuo. While the crude products are often satisfactory for pesticidal use as such, they can be purified, for example, by recrystallization from suitable solvents.

The acid halides required as starting materials in the preparation of the compounds of this invention are either chemicals of commerce or can be prepared readily, as for example, by treatment of the corresponding carboxylic acids with such reagents as $PCl_5$, $PCl_3$, $PBr_3$, $SOCl_2$, and the like in the conventional manner. The imine, 3-imino-2,2,4,4,5-pentachlorocyclopentanone, can be obtained by the treatment of hexachlorocyclopentenone with ammonia as described by Zincke and Rohde, Ann. 299, pp. 367–82 (1897). Zincke and Rohde ascribe the structure 3-amino-2,4,4,5,5-pentachlorocyclopent-2-en-1-one to their product. However, the reactivity of this compound as well as modern techniques of structure determination such as infrared studies indicate the imine structure now ascribed to this compound.

A wide variety of acid halides can be used as starting materials in preparing the compounds of this invention. While the acid halides are generally suitable reactants, the acid chlorides are preferred because of their more ready availability. For example, such straight-chain, saturated aliphatic acid chlorides as margaroyl, stearoyl, acetyl, proprionyl, butyryl, valeryl, caproyl, enanthyl, capryly, pelargonyl, capryl, hendecanoyl, laurol tridecanoyl, myristoyl, pentadecanoyl, and palmitoyl chlorides can be used. Their use will produce compounds according to this invention in which R is a straight-chain saturated aliphatic hydrocarbon radical. Similarly, such various branched-chain, saturated aliphatic acid chlorides as α-methylcaproyl chloride, pivalyl chloride, α,β-dimethylbutyryl chloride, α-methyllauroyl chloride, isobutyryl chloride, and α-ethylvaleryl chloride can be used as starting materials. Their use will produce compounds according to this invention in which R is branched-chain, saturated aliphatic hydrocarbon radical. Acid halides which have in their hydrocarbon radicals either double or triple bonds or multiple unsaturation can also be used. Typical of such acid halides are acrylyl chloride, methacrylyl chloride, senecioyl chloride, sorbyl chloride, proprиolyl chloride, 2-decenoyl chloride, and crotonyl chloride. Their use will produce compounds according to this invention in which R is an unsaturated aliphatic hydrocarbon radical. In addition, compounds according to this invention can be prepared in which R is a cyclic aliphatic hydrocarbon radical by the use of such acid halides as cyclopentanecarbonyl chloride, 1-cyclopentene-1-carbonyl chloride, cyclohexanecarbonyl chloride, 1-cyclohexene-1-carbonyl chloride, and the like. Alternately, various aromatic acid halides such as benzoyl chloride, o-ethylbenzoyl chloride, o-toluyl chloride, β-isodurylyl chloride (2,4,6-trimethylbenzoyl chloride), 4-ethyl-m-toluyl chloride, 2,3-dimethylbenzoyl chloride, 2,6-dimethylbenzoyl chloride, 3,5-dimethylbenzoyl chloride, 1-naphthoyl chloride, 2-naphthoyl chloride, p-butylbenzoyl chloride, m-isopropylbenzoyl chloride, 2,4,6-triethylbenzoyl chloride, p-sec-butylbenzoyl chloride, p-(1-methylbutyl)benzoyl chloride, and the like can also be used. Their use will produce compounds according to this invention in which R is an aromatic hydrocarbon radical. Compounds of this invention in which R is a monochlorinated hydrocarbon radical can be prepared by the use of such acid halides as the o-chlorobenzoyl, γ-chlorobutyryl, α-chloroacrylyl, m-chlorobenzoyl, α-chloro-m-toluyl, α-chlorocrotonyl, p-chlorobenzoyl, o-(2-chloroethyl)benzoyl, chloroacetyl, α-chloro-p-toluyl, γ-chlorocrotonyl, and α-chlorostearoyl chlorides, for example.

The manner in which the new compounds of this invention can be prepared is illustrated in the following examples.

EXAMPLE 1

*Preparation of 3-imino-2,2,4,4,5-pentachlorocyclopentanone*

This compound was prepared as described by Zincke and Rohde, Ann. 299, 375 (1897). The 2,3,4,4,5,5-hexachlorocyclopent-2-en-1-one required as starting material was obtained as described by Newcomer and McBee, J. Am. Chem. Soc. 71, 946 (1949). The Zincke and Rohde procedure was modified to the extent that only about one-half the amount of benzene was used as solvent and the solution of the hexachlorocyclopentenone was stirred during the addition of ammonia. The precipitate from the reaction was extracted thoroughly with ether, and the combined ether-benzene solutions were extracted once with dilute hydrochloric acid and once with water, dried over calcium chloride, and filtered. Most of the solvents were then distilled off in vacuo, whereupon the product precipitated out. The yield of 3-imino-2,2,4,4,5-pentachlorocyclopentanone, melting point 118–119° C., was essentially quantitative. Zincke and Rohde report a melting point of 118° for $C_5Cl_5O.NH_2$.

EXAMPLE 2

Preparation of the acetylimine

A mixture of 3-imino-2,2,4,4,5-pentachlorocyclopentanone (30 g.; 0.11 mole), acetyl chloride (69 g.; 0.88 mole), and 10 drops of concentrated sulfuric acid was placed in a 300 ml., round-bottomed flask fitted with a reflux condenser. The mixture was heated on the steam bath for an hour, allowed to stand overnight at room temperature, and poured into an excess of water. The precipitate was filtered off, washed with water, and recrystallized from an ether-heptane mixture to give a 74% yield of 3-acetylimino-2,2,4,4,5-pentachlorocyclopentanone, melting point 136–138° C.

Analysis for $C_7H_4Cl_5NO_2$:
 Theory: C, 27.01%; H, 1.29%; Cl, 56.92%
 Found: C, 27.41%; H, 1.33%; Cl, 57.10%

EXAMPLE 3

Preparation of the acrylylimine

A mixture of 3-imino-2,2,4,4,5-pentachlorocyclopentanone (30 g.; 0.11 mole), acrylyl chloride (63 g.; 0.7 mole) (prepared as described by Stempel, J. Am. Chem. Soc. 72, 2299 (1950)), and 5 drops of concentrated sulfuric acid was refluxed gently on the steam bath for 45 minutes. Most of the excess acrylyl chloride was distilled off in vacuo, and the residue was poured into water. The oil which separated was crystallized from a methanol-water mixture, then from a benzene-hexane mixture (Nuchar), and finally from methanol to give 14 g. (40% of theory) of 3-acrylylimino-2,2,4,4,5-pentachlorocyclopentanone, melting point 129–130° C.

Analysis for $C_8H_4Cl_5NO_2$:
 Theory: C, 29.71%; H, 1.25%; Cl, 54.82%
 Found: C, 29.40%; H, 1.45%; Cl, 55.26%

EXAMPLE 4

Preparation of the caproylimine

A mixture of 3-imino-2,2,4,4,5-pentachlorocyclopentanone (40 g.; 0.15 mole), caproyl chloride (100 g.; 0.75 mole), and 20 drops of fuming sulfuric acid was heated slowly to 70° C. and refluxed in vacuo at this temperature for 20 minutes. The mixture was then cooled and treated with 600 ml. of pentane. The oil which separated was washed several times with pentane until it solidified. This solid (30 g.) was recrystallized from ligroin, treated with Nuchar in acetone, and again recrystallized from ligroin to give crystals, melting point 62–65° C. Seventeen grams of needles, melting point 61–65° C., also formed in the combined pentane solutions. The total yield of 3-caproylimino-2,2,4,4,5-pentachlorocyclopentanone was 31.7 g. (56% of theory).

Analysis for $C_{11}H_{12}Cl_5NO_2$:
 Theory: C, 35.95%; H, 3.29%; Cl, 48.24%
 Found: C, 36.07%; H, 3.34%; Cl, 48.01%

EXAMPLE 5

Preparation of the chloroacetylimine

A mixture of 3-imino-2,2,4,4,5-pentachlorocyclopentanone (40 g.; 0.15 mole), chloroacetyl chloride (48 ml.; 0.64 mole), and 20 drops of concentrated sulfuric acid was refluxed for 1.5 hours. The excess acid chloride was distilled off in vacuo, and the residue was treated with 30 ml. of chilled benzene. The solid was filtered off, treated with ether, filtered, and recrystallized from an ether-hexane mixture to give 14 g. (27% of theory) of 3-chloroacetylimino-2,2,4,4,5-pentachlorocyclopentanone, melting point 121–123° C.

Analysis for $C_7H_3Cl_6NO_2$:
 Theory: C, 24.31%; H, 0.60%; Cl, 61.53%
 Found: C, 23.84%; H, 0.89%; Cl, 61.65%

EXAMPLE 6

Preparation of the benzoylimine

A mixture of 3-imino-2,2,4,4,5-pentachlorocyclopentanone (40 g.; 0.15 mole), benzoyl chloride (106 ml.; 0.90 mole), and 1 g. of p-toluenesulfonic acid was refluxed for 10 minutes. The excess benzoyl chloride was distilled off in vacuo, and the cooled residue was treated with 25 ml. of ether to form a slurry. Pentane (20 ml.) was added, and the precipitate was filtered off to give a crude yield of 46 g. (82%) of product. The product was mixed with 200 ml. of ether. About half the solid did not dissolve and was filtered off. The solvent was distilled off in vacuo from the filtrate, and the residue was treated with Nuchar in acetone. After filtration and distillation of the acetone in vacuo, the residue was finally recrystallized from ether. The total yield of 3-benzoylimino-2,2,4,4,5-pentachlorocyclopentanone, melting point 154–156° C., was 36.5 g. (65.5% of theory).

Analysis for $C_{12}H_6Cl_5NO_2$:
 Theory: C, 38.58%; H, 1.62%; Cl, 47.47%
 Found: C, 38.58%; H, 1.66%; Cl, 47.45%

EXAMPLE 7

Preparation of the p-chlorobenzoylimine

A mixture of 3-imino-2,2,4,4,5-pentachlorocyclopentanone (40 g.; 0.15 mole), p-chlorobenzoyl chloride (100 g.; 0.60 mole), and 1 g. p-toluenesulfonic acid was heated slowly to reflux over a period of 1 hour and then refluxed for 5 minutes. The excess acid chloride was distilled off in vacuo. The residue was treated with 50 ml. of ether to form a slurry. The crude product (19 g.) was filtered off and washed with ether. The combined ether extract and washings were treated twice with Nuchar and extracted with dilute caustic. The aqueous solution was acidified and extracted with ether. The product was precipitated with pentane, to give 4.5 g. of product. The combined products were washed with ether, treated with Nuchar in acetone, and finally recrystallized from ether to give 15 g. (24.5% of theory) of 3-p-chlorobenzoylimino-2,2,4,4,5-pentachlorocyclopentanone, melting point 145–147° C.

Analysis for $C_{11}H_5Cl_6NO_2$:
 Theory: C, 35.33%; H, 1.23%; Cl, 52.15%
 Found: C, 35.31%; H, 1.33%; Cl, 51.93%

EXAMPLE 8

Preparation of the o-chlorobenzoylimine

A mixture of 3-imino-2,2,4,4,5-pentachlorocyclopentanone (32 g.; 0.12 mole), o-chlorobenzoyl chloride (100 g.; 0.60 mole), and 1 g. p-toluenesulfonic acid was heated slowly to 150° C. and held at this temperature for 1 hour. A vacuum from a water aspirator was applied until ebullition ceased. A vacuum was again applied after heating for an additional 10 minutes, but no ebullition took place. The excess acid chloride was distilled off in vacuo. The residue was treated with 25 ml. of ether to form a slurry, which was then treated with 10 ml. of a 25% solution of ether in pentane. The solid was filtered off and washed twice with 25 ml. portions of the ether pentane solution. The solid was then recrystallized from a benzene-hexane mixture to give 29 g. of 3-o-chlorobenzoylimino-2,2,4,4,5-pentachlorocyclopentanone, melting point 134–136° C.

Analysis for $C_{12}H_5Cl_6NO_2$:
 Theory: C, 35.33%; H, 1.23%; Cl, 52.15%
 Found: C, 35.38%; H, 1.31%; Cl, 52.07%

A wide variety of other useful compounds within the scope of this invention can be prepared in the manner detailed in the previous examples. Given in the following examples are the particular acid halides required for reaction with 3-imino-2,2,4,4,5-pentachlorocyclopentanone to give the indicated typical products of this invention:

EXAMPLE 9
Margaroyl chloride=3-margaroylimino-2,2,4,4,5-pentachlorocyclopentanone.

EXAMPLE 10
Stearoyl chloride=3-stearoylimino-2,2,4,4,5-pentachlorocyclopentanone.

EXAMPLE 11
Isobutyryl chloride=3-isobutyrylimino-2,2,4,4,5-pentachlorocyclopentanone.

EXAMPLE 12
α,β-Dimethylbutyryl chloride=3-(α,β-dimethylbutyrylimino)-2,2,4,4,5-pentachlorocyclopentanone.

EXAMPLE 13
α-methylcaproyl chloride=3-(α-methylcaproylimino)-2,2,4,4,5-pentachlorocyclopentanone.

EXAMPLE 14
2-decenoyl chloride=3-(2-decenoylimino) - 2,2,4,4,5-pentachlorocyclopentanone.

EXAMPLE 15
Propriolyl chloride=3-propriolylimino-2,2,4,4,5-pentachlorocyclopentanone.

EXAMPLE 16
Cyclopentanecarbonyl chloride=3 - cyclopentanecarboximino-2,2,4,4,5-pentachlorocyclopentanone.

EXAMPLE 17
1-cyclopentene-1-carbonyl chloride=3-(1-cyclopentene-1-carboximino)-2,2,4,4,5-pentachlorocyclopentanone.

EXAMPLE 18
o-Ethylbenzoyl chloride=3 - (o-chlorobenzoylimino)-2,2,4,4,5-pentachlorocyclopentanone.

EXAMPLE 19
2,4,6-triethylbenzoyl chloride=3-(2,4,6-triethylbenzoylimino)-2,2,4,4,5-pentachlorocyclopentanone.

EXAMPLE 20
1-naphthoyl chloride=3-(1-naphthoylimino)-2,2,4,4,5-pentachlorocyclopentanone.

EXAMPLE 21
α - Chloro-m-toluyl chloride=3 - (α - chloro-m-toluylimino)2,2,4,4,5-pentachlorocyclopentanone.

EXAMPLE 22
α-Chloroacrylyl chloride=3 - (α-chloroacrylylimino)-2,2,4,4,5-pentachlorocyclopentanone.

EXAMPLE 23
α-Chlorocrotonyl chloride=3-(α-chlorocrotonylimino)-2,2,4,4,5-pentachlorocyclopentanone.

EXAMPLE 24
α-Chlorostearoyl chloride=3-(α-chlorostearoylimino)-2,2,4,4,5-pentachlorocyclopentanone.

EXAMPLE 25
α - Chloro-p-toluyl chloride=3 - (α - chloro-p-toluylimino)-2,2,4,4,5-pentachlorocyclopentanone.

EXAMPLE 26
m-Chlorobenzoyl chloride=3-(m-chlorobenzoylimino)-2,2,4,4,5-pentachlorocyclopentanone.

EXAMPLE 27
o-(2 - chloroethyl)benzoyl chloride=3-[o-(2 - chloroethyl)benzoylimino] - 2,2,4,4,5 - pentachlorocyclopentanone.

EXAMPLE 28
γ-Chlorobutyryl chloride=3-(γ-Chlorobutyrylimino)-2,2,4,4,5-pentachlorocyclopentanone.

EXAMPLE 29
Senecioyl chloride=3-senecioylimino-2,2,4,4,5-pentachlorocyclopentanone.

EXAMPLE 30
Sorbyl chloride=3-sorbylimino-2,2,4,4,5-pentachlorocyclopentanone.

EXAMPLE 31
Crotonyl chloride=3-(crotonylimino - 2,2,4,4,5-pentachlorocyclopentanone.

EXAMPLE 32
Pelargonyl chloride=3 - pelargonylimino - 2,2,4,4,5-pentachlorocyclopentanone.

EXAMPLE 33
Lauroyl chloride=3-lauroylimino-2,2,4,4,5-pentachlorocyclopentanone.

The compounds of this invention have been found useful as pesticides, particularly as fungicides and nematocides. For example, the toxicity of the compounds to test spores was determined by the slide germination technique adopted by the Committee on Standardization of Fungicidal Tests of the American Phytopathological Society. Measured concentrations of spores were placed on glass slides in contact with various concentrations of the compounds being tested. The percentage germination of spores was then determined for each treatment after 20 hours' incubation at 72° F. Three replicates were run for each test. Typical results are recorded in the table given below.

| Compound | Concn., p.p.m. | Test Organism | Percent Spore Germination | | | ED50, p.p.m. |
|---|---|---|---|---|---|---|
| Example 2 | 100 | Stemphylium sarcinae forme. | 0 | 0 | 0 | 32 |
| Example 3 | 100 | Fusarium roseum | 0 | 0 | 0 | 32 |
| Example 4 | 100 | Fusarium roseum | 2 | 2 | 2 | 40 |
| Example 4 | 100 | Monilinia fructicola | 0 | 0 | 0 | 32 |

Experiments were also carried out for the control of early blight, *Alternaria solani*, on tomato foliage. Four-week-old Bonny Best tomato plants, grown under greenhouse conditions, were mounted on a special compound turntable and sprayed with the test compounds at various concentrations for 30 seconds at 30 pounds pressure. The plants were allowed to dry, inoculated with spore suspensions of the early blight organism, and placed in an incubation chamber for 24 to 48 hours. The plants were then removed, and the number of lesions on the three main leaves of each plant was counted. Three replicates were used for each test increment. In these experiments, the product of Example 5, for example, gave 98% control of the blight at a concentration of 100 p.p.m. and thus showed an ED95 of less than 100 p.p.m. In similar experiments for control of the late blight, *Phytopthera infestans*, on tomato foliage, the product of Example 4 gave 99.2% control at a concentration of 100 p.p.m. and thus showed an ED95 of less than 100 p.p.m.

Further experiments were carried out for the protectant control of bean rust on Pinto beans with the compounds of this invention. Pinto bean seedlings, grown under greenhouse conditions, were mounted on the special compound turntable and sprayed with the test compounds at various concentrations for 30 seconds at 30 pounds pressure. The plants were allowed to dry, inoculated with spore suspensions of the bean rust organism, *Uromyces phaseoli,* and placed in an incubation chamber for 24 to 48 hours. The plants were then removed and maintained under greenhouse conditions for 10 to 14 days. The number of rust postules on the leaves of each plant was then determined. Three replicates were used for each test increment. In these experiments, for example, the product of Example 3 gave 96.5% control of the bean rust at a concentration of 100 p.p.m. and showed an ED95 of 80 p.p.m., while the product of Example 4 gave 90% control of the bean rust at the same concentration and showed an ED95 of 140 p.p.m.

The compounds of this invention also have nematocidal activity. In experiments for control of the nematode, *Panagrellus redivivus,* acetone solutions of the test compounds were dispersed in water with not more than 4 percent acetone by volume in the acetone phase, 4.5 ml. of which were then placed in respective 20 x 75 mm. vials. From 150 to 200 nematodes, 0.5 ml. by volume, were then introduced into the test solutions. Test vials for one compound only were placed in an individual water-sealed moisture chamber. A control vial of water only plus nematodes was placed in each moisture chamber. The vapor phase toxicity of a given compound was determined by the mortality induced in the control vials (water only plus nematodes) for that particular chamber. Contact toxicity was determined by mortality induced in the test compound vials per se. The results were expressed as percent living nematodes after various periods of exposure. In these experiments, for example, the product of Example 2 used at a concentration of 100 p.p.m. reduced the percent living nematodes to an average of 2% (2 replicates) after 96 hours. The product of Example 3 reduced the percent living nematodes to an average of 3.5% in 72 hours at the same concentration.

Pesticidal compositions of this invention are prepared by mixing one or more of the new compounds of this invention with inert carriers to provide formulations adapted for ready and efficient application with conventional applicator equipment to the site of the pest infestation. For example, pesticidal compositions or formulations according to this invention are prepared in the form of solids or liquids. Solid compositions are preferably in the form of dusts. These are prepared to give homogenous, free-flowing dusts by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or powdered form can also be used.

Liquid compositions according to this invention are prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the pesticidal compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, potassium laurate, morpholine oleate, sodium lauryl sulfate, sodium 2-ethylhexyl sulfate, sodium naphthalenesulfonate, sodium alkylnaphthalenesulfonate, sodium sulfosuccinate, sodium oleic acid sulfonate, sodium castor oil sulfonate, glycerol monostearate containing a soap (or a sodium fatty alcohol sulfate), lithium stearate, magnesium oleate, aluminum stearate, methyl cellulose, sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, lecithin, di- and higher polyhydric alchohol fatty acid esters, cholesterol and other fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical pesticidal compositions according to this invention can be prepared is illustrated in the following examples. All quantities given are in parts by weight.

EXAMPLE 34

*Preparation of an emulsifiable concentrate*

The following ingredients are blended thoroughly until a homogeneous liquid concentrate is obtained. This concentrate is mixed with water to give an aqueous dispersion containing the desired concentration of active compound for use as a spray.

3-acetylimino-2,2,4,4,5-pentachlorocyclopentanone __ 25
Sodium lauryl sulfate _____ 2
Sodium lignin sulfonate _____ 3
Kerosene _____ 70

EXAMPLE 35

*Preparation of a wettable powder*

The following components are mixed intimately in conventional mixing or blending equipment and are then ground to a powder having an average particle size of less than about 50 microns. The finished powder is dispersed in water to give the desired concentration of active compound.

3-acrylylimino-2,2,4,4,5-pentachlorocyclopentanone 75.00
Fuller's earth _____ 22.75
Sodium lauryl sulfate _____ 2.00
Methyl cellulose _____ .25

EXAMPLE 36

*Preparation of an oil-dispersible powder*

The following components are blended and ground as described in the previous example to give a powder which can be dispersed in oil to form a spray containing the desired concentration of active compound.

3-caproylimino-2,2,4,4,5-pentachlorocyclopentanone _ 70
Condensation product of diamylphenol with ethylene oxide _____ 4
Fuller's earth _____ 26

EXAMPLE 37

*Preparation of a dust*

The following ingredients are mixed thoroughly and then ground to an average particle size of less than about 50 microns to give a dust suitable for application with conventional dusting equipment.

3 - chloroacetylimino - 2,2,4,4,5 - pentachlorocyclopentanone _____ 20
Talc _____ 80

EXAMPLE 38

Preparation of a granular formulation

The following ingredients are mixed with sufficient water to form a paste, which is then extruded, dried, and ground to give granules, preferably from about 1/32 to 1/4-inch in diameter. The granules are applied with fertilizer spreader equipment or other conventional apparatus. The dextrin in this formulation serves as a binding agent.

| | |
|---|---|
| 3 - benzoylimino - 2,2,4,4,5 - pentachlorocyclopentanone | 10 |
| Fuller's earth | 66 |
| Dextrin | 20 |
| Sodium lignin sulfonate | 3 |
| Kerosene | 1 |

When the compounds and compositions of this invention are used as fungicides to control or prevent plant diseases caused by fungi or bacteria, they are used in several ways, depending on the particular chemical, the nature of the disease, and the nature of the plant attacked. They may be used as preventive agents to form a toxic barrier between the inoculum and the host tissue, to inhibit the production of inoculum, or to destroy the inoculum before it reaches the site of infection. They may be used as eradicating agents to destroy the disease-producing organism or its inoculum on the host tissue or in the soil. They may be used as curatives or therapeutic agents to destroy the disease-producing organisms within the plant tissues, halt their growth, or inhibit the development of their toxins or counteract them. They may also be used as prophylactic agents to immunize plants against disease. The compounds of this invention can be useful in any one or more of the above ways, but since it is much easier to protect plants from disease rather than to cure disease, the chemicals are best used in the form of protectants. These protective chemicals can act to prevent sporulation and thus reduce or eliminate the inoculum necessary for the spread of a disease. They can also prevent spores from completing their germination or incubation stage so that no infection ensues. These eradicant chemicals, which can also be considered broadly as protectants, are used to destroy disease-producing organisms or their inoculum in the soil, in dead plant organs, or on living plant tissue. When used to treat soil or seed, these compounds are usually referred to as disinfectants or disinfestants. The compounds of this invention are also useful for the control of fungal growth on wood, plastics, textiles, and like materials.

When used for the control of plant diseases, the compounds of this invention can be used as seed treatments, soil treatments, or plant treatments. Many of the disease-producing bacteria and the fungi that cause blights, spots, and rots are carried on or in seeds, roots, bulbs, tubers, corms, or other seed stock that is purchased by growers. These disease-producing organisms can be destroyed by dipping the seed or planting stock in liquid formulations of the compounds of this invention. Many plant pathogens are also soil-borne, and the application of the active compounds to the soil is one of the useful methods for control or eradication of the organisms, particularly in greenhouses, cold frames, hotbeds, and seedbeds. Both solid and liquid compositions of the compounds of this invention can be used in such soil treatments, which are also effective for soil nematode control. Plant treatments by chemicals in the form of liquid or solid fungicidal compositions are made on growing crops or on crop residues either to prevent the appearance or spread of diseases or to destroy the disease-causing organisms already present or both. This type of treatment is essential for plant protection from air-borne pathogens and is also useful in controlling many seed- and soil-borne pathogens that spread externally to the upper parts of plants. Such treatment includes the application of the active chemicals internally to prevent or destroy diseased conditions. The active compounds of this invention are applied by any of these methods in amounts sufficient to exert the desired pesticidal action. The amount of the active compound present in the pesticidal compositions as actually applied for destroying or preventing pest infestations varies with the type of application, the particular pests which are to be controlled, the purpose for which the treatment is made, and the like. Generally, the solid or liquid pesticidal compositions of this invention will contain from about 0.5% to about 90% of the active compounds.

We claim:

1. A compound of the formula:

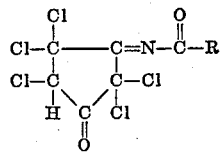

wherein R is selected from the group consisting of saturated aliphatic hydrocarbon radicals containing from 1 to 17 carbon atoms, any ring portion thereof containing not more than 6 carbon atoms, unsaturated aliphatic hydrocarbon radicals containing from 1 to 17 carbon atoms, any ring portion thereof containing not more than 6 carbon atoms, phenyl, tolyl and benzyl radicals, and their monochlorinated derivatives.

2. A compound as described in claim 1, wherein the radicals are saturated aliphatic hydrocarbon radicals containing from 1 to 17 carbon atoms, any ring portion thereof containing not more than 6 carbon atoms.

3. A compound as described in claim 1, wherein the radicals are unsaturated aliphatic hydrocarbon radicals containing from 1 to 17 carbon atoms, any ring portion thereof containing not more than 6 carbon atoms.

4. A compound as described in claim 1 wherein the radical is phenyl and its monochlorinated derivatives.

5. 3-acetylimino-2,2,4,4,5 - pentachlorocyclopentanone.

6. 3-acrylylimino - 2,2,4,4,5 - pentachlorocyclopentanone.

7. 3-caproylimino - 2,2,4,4,5 - pentachlorocyclopentanone.

8. 3-chloroacetylimino - 2,2,4,4,5 - pentachlorocyclopentanone.

9. 3-benzoylimino - 2,2,4,4,5 - pentachlorocyclopentanone.

10. A method of destroying undesirable fungi and nematodes which comprises contacting these pests with a fungicidal and nematocidal composition comprising an inert carrier and as the essential active ingredient, in a quantity which is injurious to said pests, a compound of the formula:

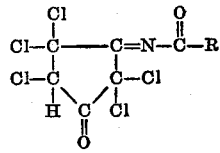

wherein R is selected from the groups consisting of saturated aliphatic hydrocarbon radicals containing from 1 to 17 carbon atoms, any ring portion thereof containing not more than 6 carbon atoms; unsaturated aliphatic hydrocarbon radicals containing from 1 to 17 carbon atoms, any ring portion thereof containing not more than 6 carbon atoms; phenyl; tolyl; benzyl; and their monochlorinated derivatives.

References Cited in the file of this patent

UNITED STATES PATENTS

| 2,643,965 | O'Brien et al. | June 30, 1953 |
| 2,731,386 | Reiner | Jan. 17, 1956 |